United States Patent
Kino et al.

(10) Patent No.: US 8,908,050 B2
(45) Date of Patent: Dec. 9, 2014

(54) IMAGING APPARATUS FOR CHANGING FIELD ANGLE ACCORDING TO APPARATUS MOVEMENT

(75) Inventors: Tatsuya Kino, Koganei (JP); Yoshinori Matsuzawa, Hachioji (JP); Osamu Nonaka, Sagamihara (JP)

(73) Assignee: Olympus Imaging Corp., Tokyo (JP)

( * ) Notice: Subject to any disclaimer, the term of this patent is extended or adjusted under 35 U.S.C. 154(b) by 506 days.

(21) Appl. No.: 12/953,175

(22) Filed: Nov. 23, 2010

(65) Prior Publication Data

US 2011/0122253 A1     May 26, 2011

(30) Foreign Application Priority Data

Nov. 25, 2009  (JP) .................. 2009-267779

(51) Int. Cl.
*H04N 5/225* (2006.01)
*H04N 5/232* (2006.01)

(52) U.S. Cl.
CPC ....... *H04N 5/23296* (2013.01); *H04N 5/23212* (2013.01); *H04N 5/23219* (2013.01)
USPC ........ 348/196; 345/156; 345/158; 348/221.1; 348/239; 348/333.01; 348/360; 348/361; 396/72; 701/533; 715/728

(58) Field of Classification Search
CPC .............. H04N 5/23212; H04N 5/232; H04N 5/23296; H04N 5/23219; G02B 7/102
USPC ............... 348/169, 221.1, 360; 701/209
IPC ........................................ H04N 5/225
See application file for complete search history.

(56) References Cited

U.S. PATENT DOCUMENTS

| | | | |
|---|---|---|---|
| 2005/0212749 A1* | 9/2005 | Marvit et al. | 345/156 |
| 2009/0128647 A1* | 5/2009 | Fahn et al. | 348/221.1 |
| 2009/0143980 A1* | 6/2009 | Halters et al. | 701/209 |
| 2009/0268082 A1* | 10/2009 | Shibuno et al. | 348/360 |
| 2010/0275122 A1* | 10/2010 | Buxton et al. | 715/728 |

FOREIGN PATENT DOCUMENTS

JP        2002-135764        5/2002

* cited by examiner

*Primary Examiner* — Jayanti K Patel
*Assistant Examiner* — Neil Mikeska
(74) *Attorney, Agent, or Firm* — Straub & Pokotylo; John C. Pokotylo

(57) ABSTRACT

An imaging apparatus includes an imaging unit, a field angle change unit, and a movement detection unit. The imaging unit includes a lens that forms an image of a subject and acquires a picture image by taking the image formed by the lens. The field angle change unit changes a field angle of the picture image acquired by the imaging unit. The movement detection unit detects a movement of the imaging apparatus. The field angle change unit changes the field angle of the picture image in accordance with a moving direction of the imaging apparatus when the movement detection unit detects the movement of the imaging apparatus.

18 Claims, 11 Drawing Sheets

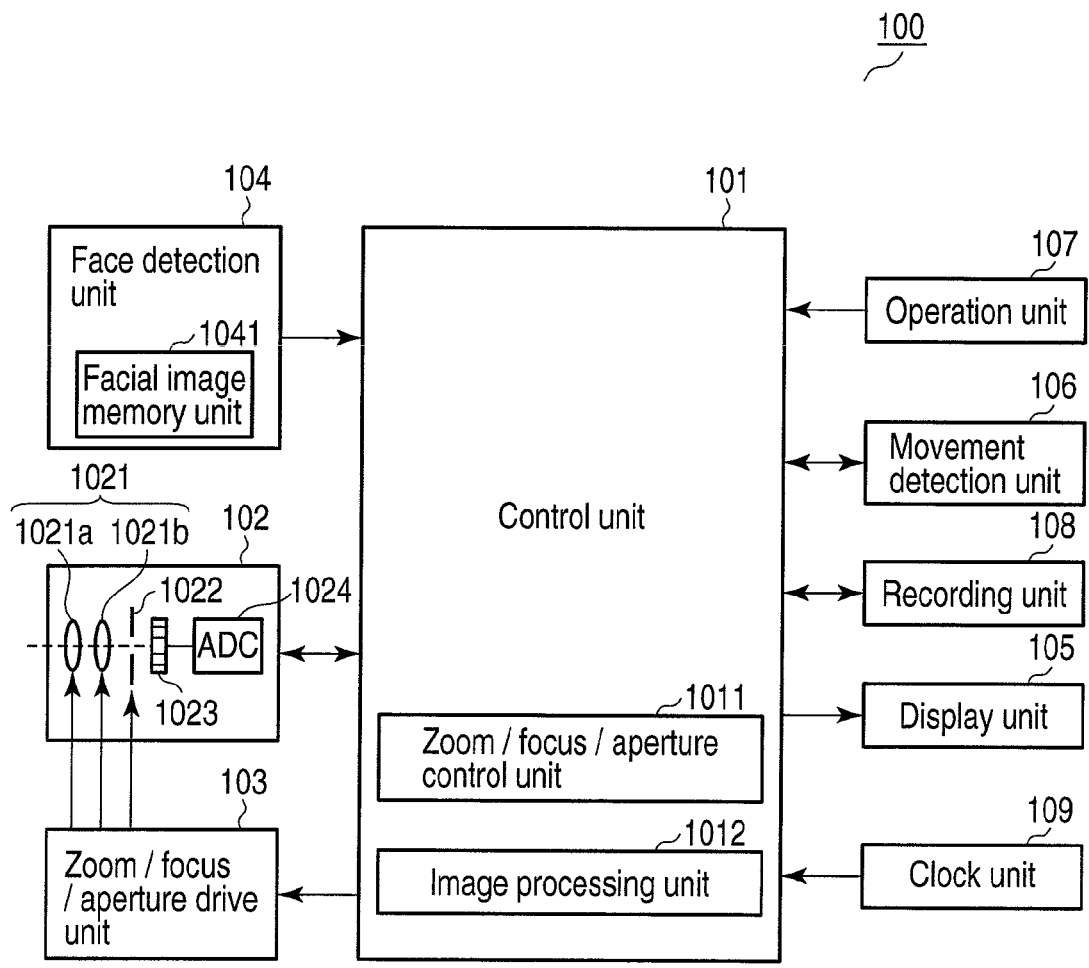
F I G. 1

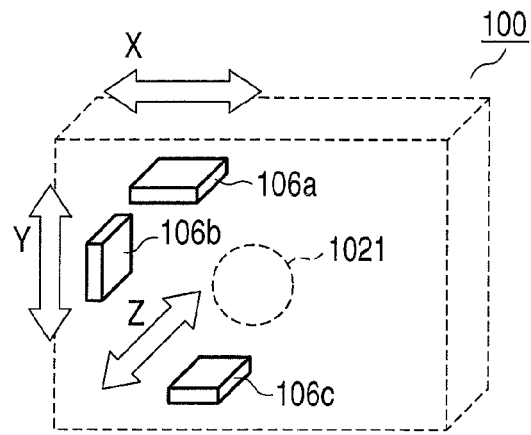
F I G. 2 A
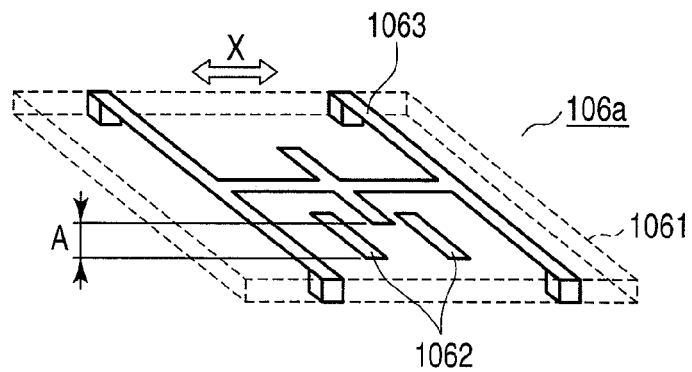
F I G. 2 B
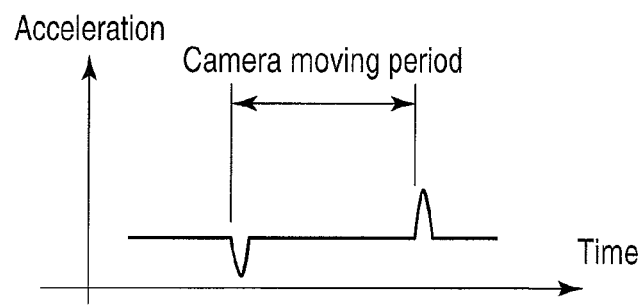
F I G. 2 C

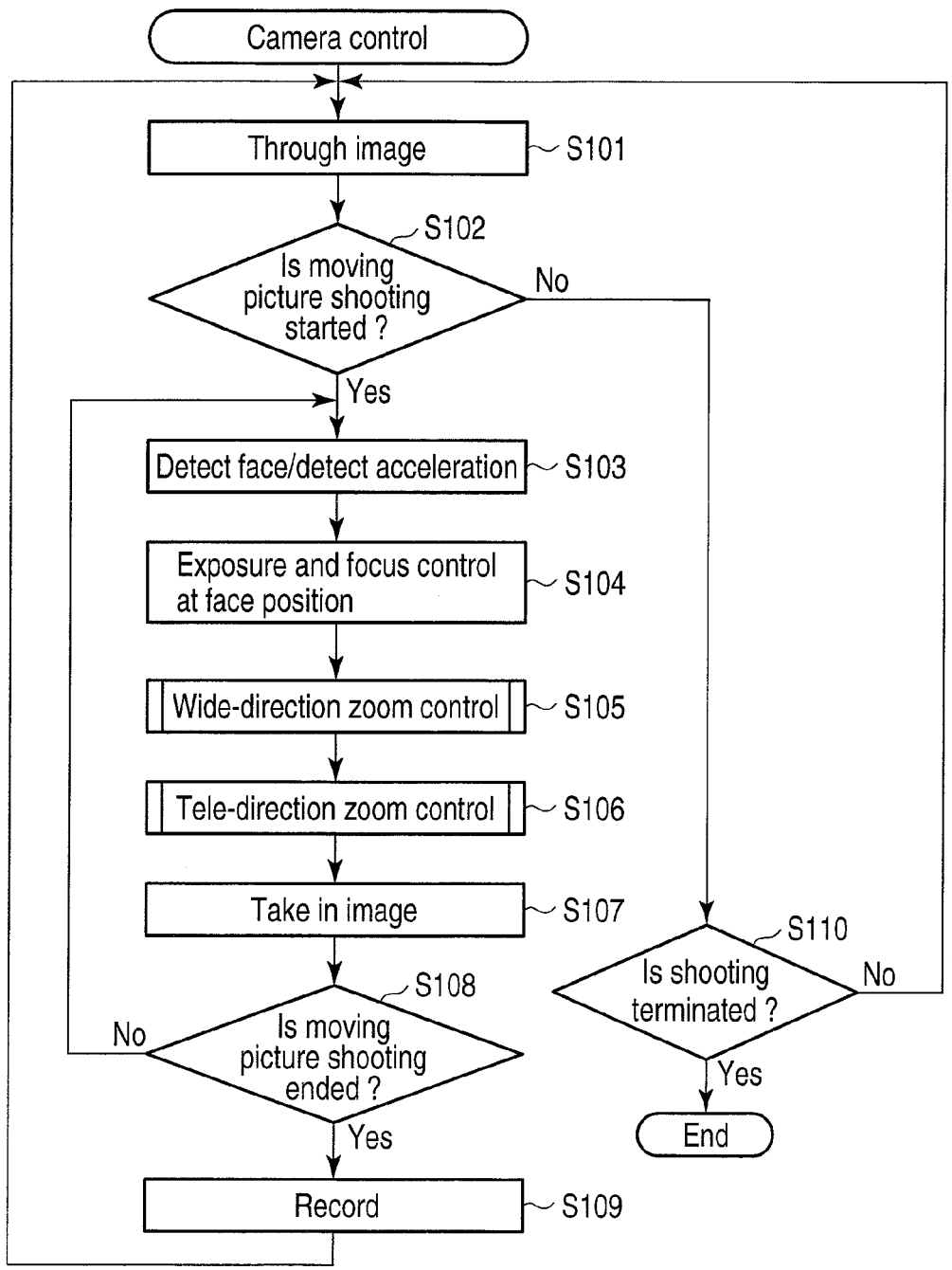
F I G. 3

IMAGING APPARATUS FOR CHANGING FIELD ANGLE ACCORDING TO APPARATUS MOVEMENT

CROSS-REFERENCE TO RELATED APPLICATIONS

This application is based upon and claims the benefit of priority from prior Japanese Patent Application No. 2009-267779, filed Nov. 25, 2009, the entire contents of which are incorporated herein by reference.

BACKGROUND OF THE INVENTION

1. Field of the Invention

The invention relates to an imaging apparatus having a zoom function.

2. Description of the Related Art

In recent years, almost all imaging apparatuses such as digital cameras have a zoom function. The zoom function is a function configured to change a field angle of an image acquired in an imaging apparatus. For example, shooting at a wider field angle can be performed based on zooming on a wide-angle (wide) side, and a subject at a longer distance can be shot based on zooming on a telephotographic (tele) side.

In regard to the imaging apparatus having such a zoom function, various kinds of suggestions have been made. For example, in JP-A 2002-135764 (KOKAI), when a movement of an object is detected, electronic zoom is effected to enlarged this object.

BRIEF SUMMARY OF THE INVENTION

According to an aspect of the invention there is provided, an imaging apparatus comprising: an imaging unit which comprises a lens that forms an image of a subject and which is configured to acquire a picture image by taking the image formed by the lens; a field angle change unit configured to change a field angle of the picture image acquired by the imaging unit; and a movement detection unit configured to detect a movement of the imaging apparatus, wherein the field angle change unit changes the field angle of the picture image in accordance with a moving direction of the imaging apparatus when the movement detection unit detects the movement of the imaging apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view showing a configuration of a digital camera as an example of an imaging apparatus according to a first embodiment of the invention;

FIG. 2A, FIG. 2B, and FIG. 2C are views showing an example of a configuration of a movement detection unit;

FIG. 3 is a flowchart showing an operation at the time of moving picture shooting of the imaging apparatus according to the first embodiment of the invention;

DETAILED DESCRIPTION OF THE INVENTION

Figure 4:
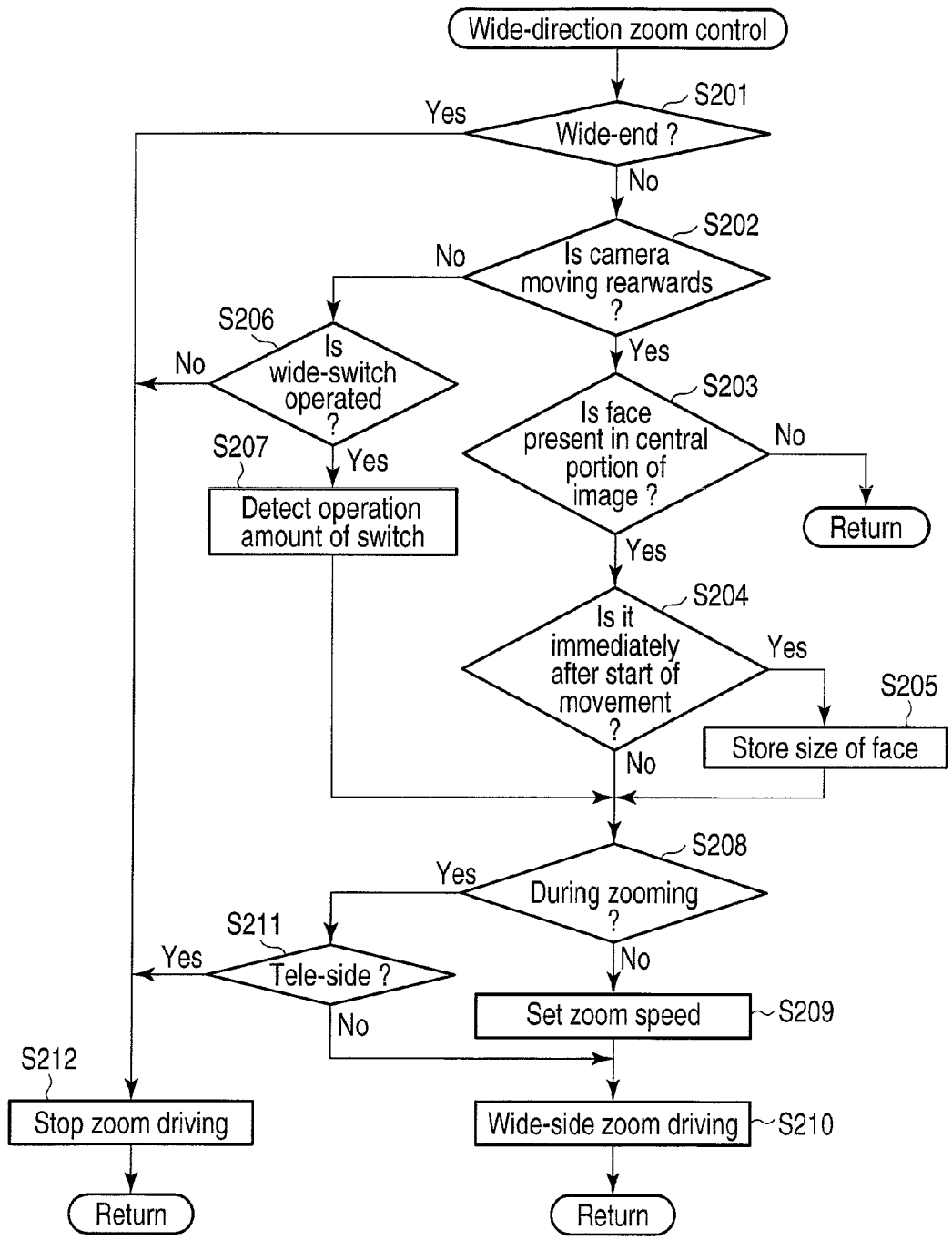
FIG. 4 is a flowchart showing wide-direction zoom control processing.

An embodiment according to the present invention will now be described hereinafter with reference to the accompanying drawings.

[First Embodiment]

A first embodiment according to the invention will be first described. FIG. 1 is a view showing a configuration of a digital camera (which will be simply referred to as a camera hereinafter) as an example of an imaging apparatus according to the first embodiment of the invention. A camera 100 depicted in FIG. 1 includes a control unit 101, an imaging unit 102, a zoom/focus/aperture drive unit 103, a face detection unit 104, a display unit 105, a movement detection unit 106, an operation unit 107, a recording unit 108, and a clock unit 109.

The control unit 101 is a control circuit that collectively controls operations of the respective blocks in the camera 100. The control unit 101 controls operations of, e.g., the imaging unit 102, the face detection unit 104, the display unit 105, and others in response to an operation via the operation unit 107 by a user. Moreover, the control unit 101 includes a zoom/focus/aperture control unit 1011 and an image processing unit 1012.

The zoom/focus/aperture control unit 1011 controls driving of the zoom/focus/aperture drive unit 103 to control a zoom position of a zoom lens 1021a, a focus position of a focus lens 1021b, or an open amount of an aperture diaphragm 1022. The image processing unit 1012 executes image processing with respect to an image obtained by the imaging unit 102. This image processing includes, e.g., color correction processing, gradation correction processing, scaling processing, and compression processing (still picture compression or moving picture compression) for an image obtained by the imaging unit 102, expansion processing for a compressed image, and others.

The imaging unit 102 includes a lens system 1021, the aperture diaphragm 1022, an imaging element 1023, an A/D converter (ADC) 1024, and others. The lens system 1021 is an optical system configured to form an image of a light flux from a subject on a photoelectric conversion plane of the imaging element 1023. The lens system 1021 in this embodiment includes a zoom lens 1021a and a focus lens 1021b. The zoom lens 1021a is a lens configured to change a field angle of an image obtained by the imaging element 1023. The focus lens 1021b is a lens configured to adjust a focal position of the lens 1021. The zoom lens 1021a and the focus lens 1021b are driven by the zoom/focus/aperture drive unit 103 under control of the zoom/focus/aperture control unit 1011 of the control unit 101. The aperture diaphragm 1022 restricts an incidence amount of a light flux with respect to the photoelectric conversion plane of the imaging element 1023. The imaging element 1023 includes the photoelectric conversion plane that has pixels two-dimensionally arranged thereon and converts a light flux having entered through the lens system 1021 into an electrical signal (an image signal). The ADC 1024 converts an analog image signal obtained by the imaging element 1023 into digital image data (which will be simply referred to as an image hereinafter). The thus configured imaging unit 102 images a subject under control of the control unit 101, thereby acquiring an image concerning the subject.

The zoom/focus/aperture drive unit 103, the control unit 101, and the zoom/focus/aperture control unit 1011 function as a field angle change unit. The zoom/focus/aperture drive unit 103 includes a drive unit such as a motor and drives each of the zoom lens 1021a, the focus lens 1021b, and the aperture diaphragm 1022 under control of the zoom/focus aperture control unit 1011 of the control unit 101.

The face detection unit 104 detects a face in an image acquired by the imaging unit 102. This face detection unit 104 detects shading of a face such as eyes, a nose, or a mouth from an image acquired by the imaging unit 102 to detect the facial part. Additionally, the face detection unit 104 stores information of an image of the detected facial part (e.g., an image of the facial part itself, positional information of a facial image, and size information of the facial image) in a facial image memory unit 1041. The facial image memory unit 1041 is composed of, e.g., an RAM. Here, a detection result of an image of a facial part obtained by the face detection unit 104 is utilized for, e.g., focusing of the focus lens 1021b in the imaging unit 102.

The display unit 105 is, e.g., a liquid crystal display (LCD) or an organic electroluminescence display (ELD) provided on a back surface of the camera 100. The display unit 105 displays various kinds of images such as an image obtained by the imaging unit 102 under control of the control unit 101.

The movement detection unit 106 detects a movement of the camera 100. This movement detection unit 106 includes movement detection units 106a, 106b, and 106c as shown in FIG. 2A. The movement detection unit 106a detects a movement of the camera 100 along an X direction which is a left-and-right direction as seen from a front surface (a surface on a side where the lens 1021 is provided) when a main body of the camera 100 faces a front side. The movement detection unit 106b detects a movement of the camera 100 long a Y direction which is an up-and-down direction when the main body of the camera 100 is seen from the front side. The movement detection unit 106c detects a movement of the camera 100 along a Z direction which is a front-and-back direction (i.e., a direction parallel to an optical axis of the lens 1021) when the main body of the camera 100 is seen from the front side.

FIG. 2B is a view showing a configuration as an example of the movement detection unit 106a. The movement detection units 106b and 106c are just different in directions along which they are arranged with respect to the movement detection unit 106a, but they have the same internal configuration. Therefore, the detailed description of the movement detection units 106b and 106c will be omitted.

As shown in FIG. 2B, the movement detection unit 106a includes two electrodes 1062 fixed to a main body 1061 of the movement detection unit 106a and an electrode 1063 arranged to interpose between these electrodes 1062, and it can detect a change in voltage between the electrodes 1062 and the electrode 1063 through the electrodes 1062.

In such a configuration as depicted in FIG. 2B, for example, when the camera 100 moves, the electrode 1063 bends in accordance with an acceleration occurred to by this moment. As a result, an electrostatic capacitance between the electrode 1062 and the electrode 1063 (A in the drawing) varies. Detecting this change in electrostatic capacitance enables detecting an acceleration generated in the camera 100. FIG. 2C shows a change in acceleration with time when the acceleration in the X direction is produced in the camera 100. As shown in FIG. 2C, the acceleration increases immediately after start of a movement of the camera 100 and immediately before end of a movement of the same, and the movement of the camera 100 can be detected by detecting such a change in acceleration. Further, a direction of a change in acceleration can be determined by determining whether a signal indicative of the acceleration has changed to increase or to decrease.

When the acceleration obtained as shown in FIG. 20 is integrated once by time, a movement velocity of the camera 100 can be acquired. Furthermore, when the acceleration obtained as shown in FIG. 2C is integrated twice by time, a distance of the camera 100 in the X direction can be acquired.

The operation unit 107 corresponds to various kinds of operation units configured to operate the camera 100 by a photographer. This operation unit 107 includes a power supply button, a release button, a zoom switch (including a wide-switch and a tele-switch), a mode dial, and others. The power supply button is an operation unit configured to instruct ON or OFF of a power supply of the camera 100. The release button is an operation unit configured to instruct shooting (acquisition of an image for recording) using the camera 100. The zoom switch is an operation unit configured to instruct zoom driving of the zoom lens 1021a in the imaging unit 102. The mode dial is an operation unit configured to switch an operation mode of the camera 100 to a shooting mode (a still picture or a moving picture) or a reproduction mode.

The recording unit 108 records an image for recording that is acquired by the imaging unit 102 and compressed and obtained by the control unit 101. This recording unit 108 is, e.g., a memory card that can be attached to/detached from the camera 100. The clock unit 109 measures various kinds of time such as a shooting date and time. When a shooting date and time is recorded, e.g., a header information portion of an image recorded in the recording unit 108, management of the image recorded in the recording unit 108 can be facilitated.

An operation of the camera 100 in the first embodiment will now be described hereinafter. FIG. 3 is a flowchart showing an operation of the camera 100 according to the first embodiment at the time of shooting a moving picture.

When an operation mode of the camera 100 is set to a moving picture shooting mode, an operation shown in FIG. 3 begins. The control unit 101 first executes through image display (Step S101). In the through image display, the control unit 101 acquires an image by the imaging unit 102 at each predetermined timing. The control unit 101 utilizes the image processing unit 1012 to execute image processing (gradation correction processing, color correction processing, reduction processing, and others) every time the imaging unit 102 acquires an image. As a result, the number of pixels in the image acquired by the imaging unit 102 is conformed to the number of pixels associated with a screen size of the display unit 105. Further, the control unit 101 displays the image subjected to the image processing in the display unit 105. Based on such through image display, a user can utilize the display unit 105 to observe a subject.

After the through image display, the control unit 101 determines whether start of shooting a moving image has been instructed by an operation of the operation unit 107 by a user (Step S102). In the determination at Step S102, when the start of shooting a moving image has been instructed, the control unit 101 detects an image of a facial part by using the face detection unit 104 and detects an acceleration produced in the camera 100 (i.e., a movement of the camera 100) by using the movement detection unit 106 (Step S103).

After the face detection and the acceleration detection, the control unit 101 controls exposure of the imaging unit 102 in such a manner that exposure of the facial part (e.g., a facial part at the center of the screen when a plurality of facial parts have been detected) detected by the face detection unit 104 becomes correct exposure. Furthermore, the control unit 101 controls a focal position of the focus lens 1021b in such a manner that the facial part detected by the face detection unit 104 is focused (Step S104). At the time of exposure control, the control unit 101 detects brightness of the facial part in the image acquired by the imaging unit 102. Moreover, the control unit 101 calculates an open amount of the aperture diaphragm 1022 that can provide adequate brightness of the facial part based on the detected brightness of the facial part. Then, the control unit 101 utilizes the zoom/focus/aperture control unit 1011 to control the zoom/focus/aperture drive unit 103, thereby driving the aperture diaphragm 1022. As a result, the brightness of the facial part becomes adequate. Additionally, at the time of focus control, the control unit 101 utilizes the zoom/focus/aperture control unit 1011 to drive the zoom/focus/aperture drive unit 103 so that the facial part of the image acquired by the imaging unit 102 can have maximum contrast. As a result, the facial part becomes the best focus state. Each of the exposure control and the focus control may be executed by using a dedicated sensor.

After the exposure control and the focus control, the control unit 101 performs wide-direction zoom control processing (Step S105). After the wide-direction zoom control processing, the control unit 101 carries out tele-direction zoom control processing (Step S106). Particulars of the wide-direction zoom control processing and the tele-direction zoom control processing will be described later.

After the tele-direction zoom control processing, the control unit 101 takes the image obtained through the imaging unit 102 into a non-illustrated memory (Step S107). Then, the control unit 101 determines whether end of shooting a moving image has been instructed by an operation of the operation unit 107 by a user (Step S108). In the determination at Step S108, when the end of shooting a moving image has not been instructed, the processing returns to Step S103. In this case, the control unit 101 continues shooting a moving image. On the other hand, in the determination at Step S108, when the end of shooting a moving image has been instructed, the control unit 101 subjects the moving image taken in the memory to image processing (e.g., moving picture compression processing) by using the image processing unit 1012 and then records the processed moving image in the recording unit 108 (Step S109). Thereafter, the processing returns to Step S101.

Further, in the determination at Step S102, when the start of shooting a moving image has not been instructed, the control unit 101 determines whether end of the moving image shooting mode has been instructed (Step S110). In this determination, for example, when the power supply of the camera 100 is turned off by an operation of the operation unit 107 by the user, or when the operation mode of the camera 100 is changed from the moving image shooting mode to another mode, it is determined that the end of the moving image shooting mode has been instructed. In the determination at Step S110, when the end of the moving image shooting mode has not been instructed, the processing returns to Step S101. On the other hand, in the determination at Step S110, when the end of the moving image shooting mode has been instructed, the control unit 101 terminates the processing shown in FIG. 3.

The wide-direction zoom control processing in this embodiment will now be described. FIG. 4 is a flowchart showing the wide-direction zoom control processing in this embodiment. In FIG. 4, the control unit 101 determines whether a position of the zoom lens 1021a is provided at a wide-end (Step S201). In the determination at Step S201, when the position of the in zoom lens 1021a is not provided at the wide-end, i.e., when the zoom lens 1021a can be still driven in the wide-direction, the control unit 101 determines whether the camera 100 is moving toward the rear side from the acceleration detection result obtained by the movement detection unit 106 at Step S103 in FIG. 3 (Step S202).

In the determination at Step S202, when the camera 100 is moving toward the rear side, the control unit 101 detects a face by using the face detection unit 104 and determines whether a facial part is present in a central portion of an image obtained via the imaging unit 102 (Step S203). In the determination at Step S203, when the facial part is not present in the central portion of the image obtained through the imaging unit 102, the control unit 101 terminates the processing depicted in FIG. 4. On the other hand, in the determination at Step S203, when the facial part is present in the central part of the image obtained through the imaging unit 102, the control unit 101 determines whether this moment is immediately after start of a movement of the camera 100 toward the rear side (Step S204). In the determination at Step S204, when this moment is immediately after the start of the movement toward the rear side, the control unit 101 stores size information of the image of the face in the central portion in the facial image memory unit 1041 (Step S205). Then, the control unit 101 advances the processing to Step S208.

Further, in the determination at Step S202, when the camera is not moving toward the rear side, the control unit 101 determines whether the wide-switch is being operated (Step S206). In the determination at Step S206, when the wide-switch is being operated, the control unit 101 detects an operation amount of the wide-switch (Step S207). Thereafter, the control unit 101 advances the processing to Step S208.

In the determination at Step S204, when this moment is not immediately after the start of the movement of the camera 100 toward the rear side, after Step S205 or Step S207, the control unit 101 determines whether the zoom lens 1021a is currently being driven (Step S208). In the determination at Step S208, when the zoom lens 1021a is not being driven, the control unit 101 sets a driving speed (a zoom speed) of the zoom lens 1021a in accordance with an operation amount of the wide-switch or an acceleration (which may be a speed instead) of the camera 100 (Step S209). The zoom speed is set to be proportionate to the operation amount of the wide-switch or the acceleration of the camera 100, for example. When the zoom speed is changed, a change speed for a field angle of an image obtained by the imaging unit 102 varies. After setting the zoom speed, the control unit 101 controls the zoom/focus/aperture drive unit 103 by using the zoom/focus/aperture control unit 1011 to drive the zoom lens 1021*a* to the wide-side in accordance with the zoom speed set at Step S209 (Step S210). Then, the control unit 101 terminates the processing depicted in FIG. 4.

Additionally, in the determination at Step S208, when the zoom lens 1021*a* is being driven, the control unit 101 determines whether a current driving direction for the zoom lens 1021*a* corresponds to the tele-side (Step S211). In the determination at Step S211, when the current driving direction for the zoom lens 1021*a* does not correspond to the tele-side, i.e., when it corresponds to the wide-side, the control unit 101 executes the processing of Step S210. That is, the control unit 101 performs zoom driving toward the wide-side.

Further, when the position of the zoom lens 1021*a* is provided at the wide end in the determination at Step S201, when the wide-switch is not operated in the determination at step S206, or when the current driving direction for the zoom lens 1021*a* corresponds to the tele-side in the determination at Step S211, the control unit 101 stops the zoom driving (Step S212). Then, the control unit 101 terminates the processing in FIG. 4.

Figure 5:
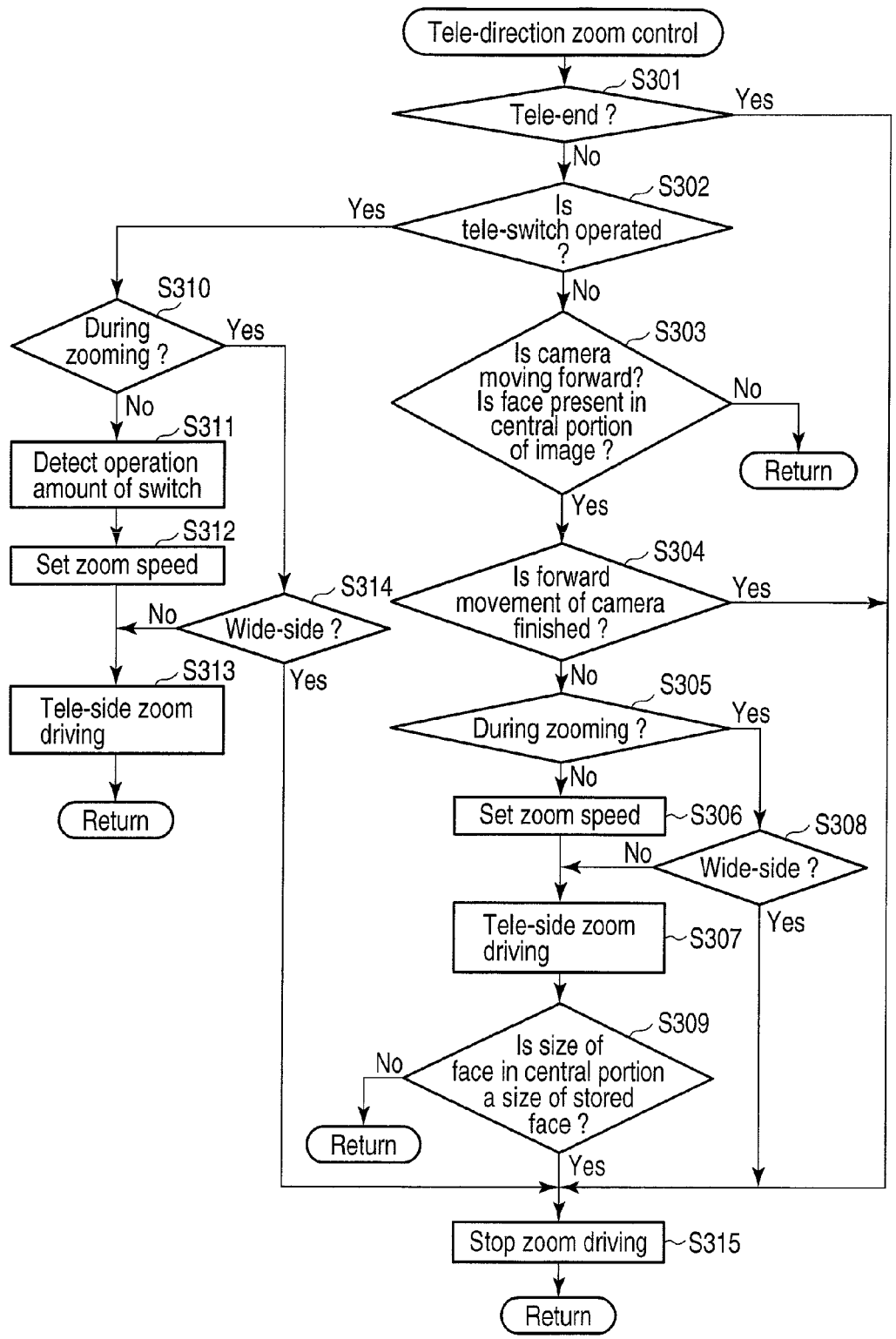
FIG. 5 is a flowcharting showing tele-direction zoom control processing.

The tele-direction zoom control processing in this embodiment will now be described. FIG. 5 is a flowchart showing the tele-direction zoom control processing in this embodiment. In FIG. 5, the control unit 101 determines whether a position of the zoom lens 1021*a* is provided at a tele-end (Step S301). In the determination at Step S301, when the position of the zoom lens 1021*a* is not provided at the tele-end, i.e., when the zoom lens 1021*a* can be still driven in the tele-direction, the control unit 101 determines whether the tele-switch is operated (Step S302). In the judgment at Step S302, when the tele-switch is not operated, the control unit 101 determines whether the camera 100 is moving forward and whether a facial part is present in a central portion of an image obtained through the imaging unit 102 from an acceleration detection result of the movement detection unit 106 at the step S103 in FIG. 3 (Step S303). In the determination at Step S303, when the camera 100 is not moving forward or when a facial part is not present in the central portion of the image obtained through the imaging unit 102, the control unit 101 terminates the processing in FIG. 5.

In the determination at Step S303, when the camera 100 is moving forward and a facial part is present in the central portion of the image obtained through the imaging unit 102, the control unit 101 determines whether the forward movement of the camera 100 has been terminated (Step S304). In the determination at Step S304, the forward movement of the camera 100 has not been terminated the control unit 101 determines whether the zoom lens 1021*a* is currently being driven (Step S305). In the determination at Step S305, when the zoom lens 1021*a* is not being driven, the control unit 101 sets a driving speed (a zoom speed) of the zoom lens 1021*a* in accordance with an acceleration (which may be a speed) of the camera 100 (Step S306). After setting the zoom speed, the control unit 101 utilizes the zoom/focus/aperture control unit 1011 to control the zoom/focus/aperture drive unit 103 and drives the zoom lens 1021*a* to the tele-side in accordance with the zoom speed set at Step S306 (Step S307). Furthermore, in the determination at Step S305, when the zoom lens 1021*a* is being driven, the control unit 101 determines whether a current driving direction for the zoom lens 1021*a* corresponds to the wide-side (Step S308). In the determination at Step S308, when the current driving direction for the zoom lens 1021*a* does not correspond to the wide-side, i.e., when it corresponds to the tele-side, the control unit 101 executes the processing of Step S307. That is, the control unit 101 performs zoom driving toward the tele-side.

After the zoom driving toward the tele-side, the control unit 101 utilizes the face detection unit 104 to detect a face and determines whether a size of a facial part in a central portion of an image obtained through the imaging unit 102 is equal to a size of a facial part stored in the facial image memory unit 1041 (Step S309). The facial part in the central portion detected by the face detection unit 104 at Step S309 may be a facial part of a person different from the facial part stored in the facial image memory unit 1041. In this case, it can be considered that a shape of the facial part may be different. Therefore, in the determination at Step S309, it is determined that a size of the facial part detected by the face detection unit 104 is not necessarily equal to a size of the facial part stored in the facial image memory unit 1041. That is, a certain level of error margin is provided in advance, and a size of the facial part detected by the face detection unit 104 is determined to be equal to a size of the facial part stored in the facial image memory unit 1041 when a difference between both the sizes falls within the error margin. In the determination at Step S309, when the size of the facial part detected by the face detection unit 104 is not equal to the size of the facial part stored in the facial image memory unit 1041, the control unit 101 terminates the processing shown in FIG. 5.

Further, when the tele-switch is operated in the determination at Step S302, the control unit 101 determines whether the zoom lens 1021*a* is being driven (Step S310). In the determination at Step S310, when the zoom lens 1021*a* is not being driven, the control unit 101 detects an operation amount of the tele-switch (Step S311). Furthermore, the control unit 101 sets a driving speed (a zoom speed) for the zoom lens 1021*a* in accordance with the operation amount of the tele-switch (Step S312). After setting the zoom speed, the control unit 101 controls the zoom/focus/aperture drive unit 103 by using the zoom/focus/aperture control unit 1011, thereby driving the zoom lens 1021*a* toward the tele-side in accordance with the zoom speed set at the step S312 (Step S313). Then, the control unit 101 terminates the processing shown in FIG. 5.

Moreover, in the determination at step S310, when the zoom lens 1021*a* is being driven, the control unit 101 determines whether a current driving direction for the zoom lens 1021*a* corresponds to the wide-side (Step S314). In the determination at Step S314, when the current driving direction for the zoom lens 1021*a* does not correspond to the wide-side, i.e., when it corresponds to the tele-side, the control unit 101 executes the processing of the step S313. That is, the control unit 101 performs zoom driving toward the tele-side.

Additionally, when the position of the zoom lens 1021*a* is provided at the tele-end in the determination at Step S301, when the forward movement of the camera 100 is terminated in the determination at Step S304, when the current driving direction for the zoom lens 1021*a* corresponds to the wide-side in the determination at Step S308, when the size of the facial part detected by the face detection unit 1047 is equal to the size of the facial part stored in the facial image memory unit 1041 in the determination at the step S309, or when the current driving direction for the zoom lens 1021*a* corresponds to the wide-side in the determination at Step S314, the control unit 101 stops the zoom driving (Step 315). Then, the control unit 101 terminates the processing shown in FIG. 5.

Figures 6A, 6B:
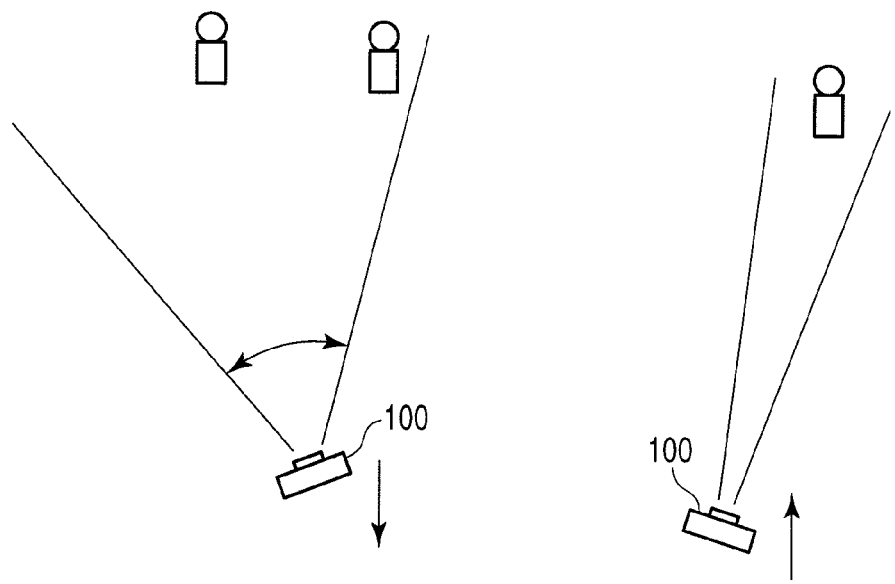
FIG. 6A is a view showing an outline of the wide-direction zoom control processing.
FIG. 6B is a view showing an outline of the tele-direction zoom control processing.

As described above, in the first embodiment, when a photographer who is toting the camera 100 moves rearwards (a direction along which the lens system 1021 recedes from a subject) as shown in FIG. 6A, the zoom lens 1021a moves toward the wide-side by the wide-direction zoom control processing. When the photographer toting the camera 100 moves rearwards, it can be considered that this person intends to do shooting at a wide field angle from the beginning. Therefore, when a setting is configured to perform zooming toward the wide-side with a rearward movement of the camera 100, the photographer does not have to move rearwards beyond necessity, and he/she can do the shooting at a wide field angle. Further, at this moment, the photographer does not have to operate the wide-switch. Therefore, the photographer can contribute his/her energy to framing.

Furthermore, when a facial part is present in a central portion of an image acquired by the imaging unit 102 at the moment that the photographer toting the camera 100 moves frontwards (a direction along which the lens system 1021 gets closer to the subject) as shown in FIG. 6B, the zoom lens 1021a moves toward the tele-side by the tele-direction zoom control processing. When the facial part is present in the central portion of the image acquired by the imaging unit 102 at the moment that the photographer toting the camera 100 moves forwards, it can be considered that this person intends to do shooting while paying attention to the subject having this facial part. Therefore, in this case, when a setting is configured to perform zooming toward the tele-side, the photographer does not have to move forwards more than necessity, and he/she can perform the shooting while paying attention to the desired subject. Moreover, at this moment, the photographer does not have to operate the tele-switch. Therefore, the photographer can contribute his/her energy to framing.

Figure 7A:
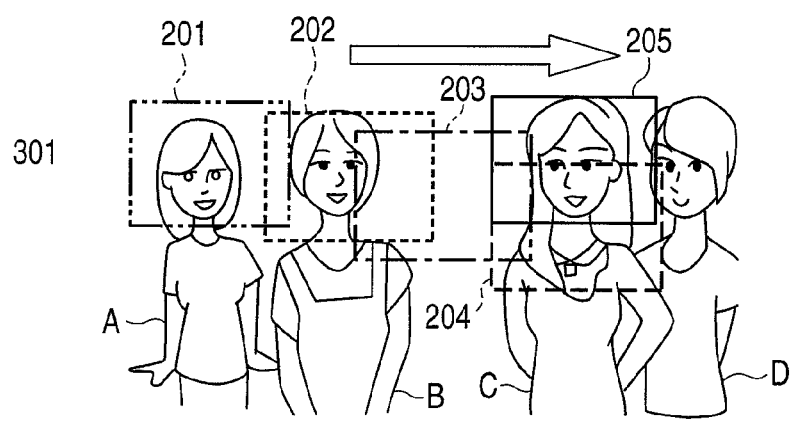
FIG. 7A and FIG. 7B are views each showing an example of a moving image obtained when the wide-direction zoom control processing and the tele-direction zoom processing are not executed.
Figure 7B:
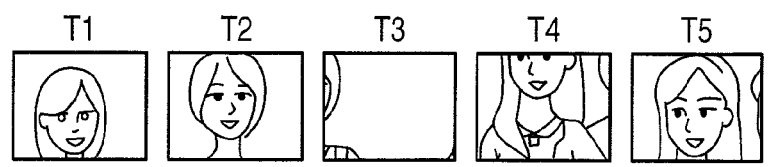

Here, at the time of shooting a moving picture as shown in FIG. 2A to FIG. 2C, an operation called panning (doing shooting while turning the camera in left, right, upper, and lower shooting directions) may be carried out. In such panning, the camera may be swayed by, e.g., hand movements when turning the camera, and it is difficult for a user to perform intended shooting. For example, in such a scene as depicted in FIG. 7A, it is assumed that panning is performed in an arrow direction in the drawing and a moving picture corresponding to five frames is shot. When the camera is swayed in such a case, a shooting range provided by the camera is changed little by little as indicated by reference numerals 201 to 205 with this sway of the camera. Therefore, a moving image obtained as a result of shooting is also changed little by little as indicated by T1 to T5 in FIG. 7B. A person who watched the moving image swayed in this manner may possibly feel discomfort.

Additionally, FIG. 7A shows a scene of shooting four persons A to D. At this time, when distances between the camera 100 and the persons A to D are different from each other, shooting the respective persons in similar compositions without zooming is difficult. For example, in case of trying acquiring at a timing T4 an image of the person C in the same composition as that of an image of the person A obtained at a timing T1 with a field angle 201, when the person C is present at a position closer to the camera than the person A, a part of a face of the person C is missed in the image obtained at the timing T4 if a field angle remains as a field angle 204 equal in to the field angle 201. Therefore, shooting at a larger field angle than the field angle 201 at the timing T4 is desirable.

Figure 8A:
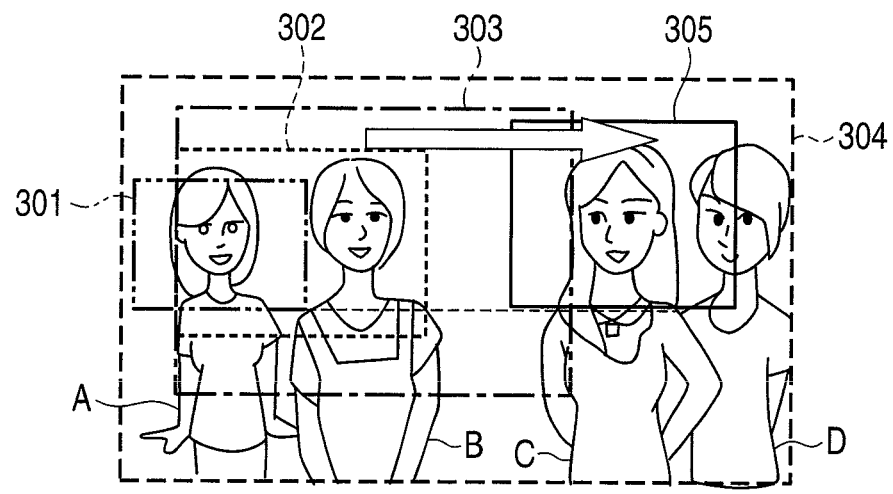
FIG. 8A and FIG. 8B are views each showing an example of a moving image obtained when the wide-direction zoom control processing and the tele-direction zoom processing are executed.

In this embodiment, the wide-side zooming is performed when a photographer toting the camera 100 moves away from a subject, and the tele-side zooming is carried out when the photographer moves closer to the subject. As a result, even in case of shooting a moving picture while effecting panning in an arrow direction depicted in FIG. 8A, when the photographer just slightly moves, a shooting range of the camera 100 can be changed as indicated by reference numerals 301 to 305. As a result, the possibility that a person who watched the moving image may feel discomfort can be reduced.

Figure 8B:
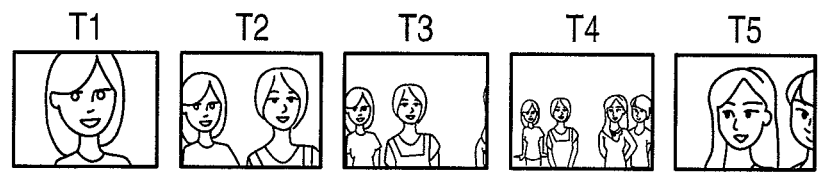

Furthermore, in the tele-direction zoom control processing in this embodiment, zooming toward the tele-side is carried out in such a manner that a size of a face stored immediately after start of the wide-direction zoom control processing coincides with a size of a face in an image obtained by subsequent shooting. Therefore, such a moving image as depicted in FIG. 8B can be easily shot. That is, the possibility that an image missing a part of a person's face is shot can be reduced.

Modifications of the wide-direction zoom control processing and the tele-direction zoom control processing will now be described.

Figure 9:
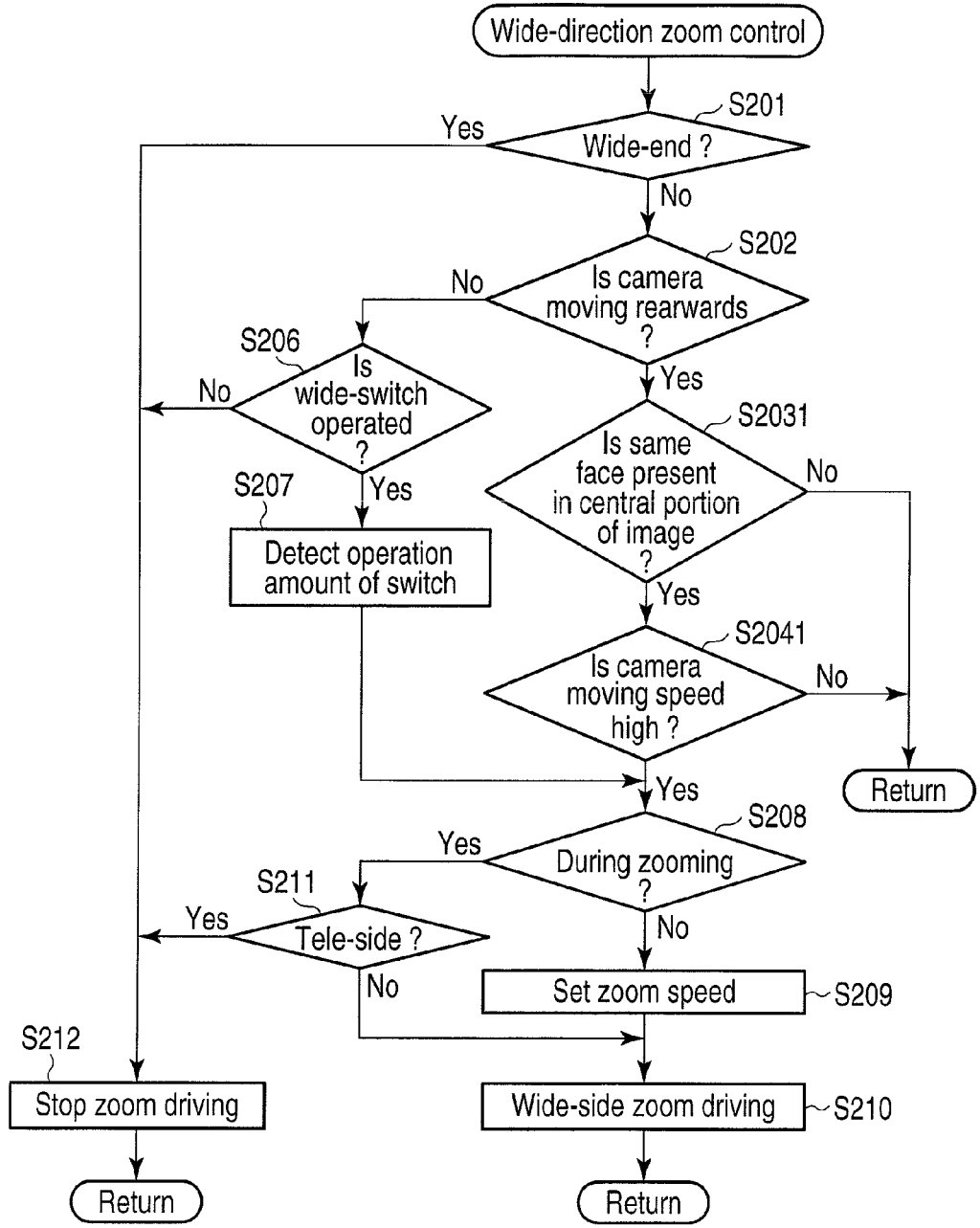
FIG. 9 is a flowchart showing a modification of the wide-direction zoom control processing.

First, a modification of the wide-direction zoom control processing will be explained with reference to FIG. 9. In FIG. 9, step numbers different from those in FIG. 4 denote steps different from those in FIG. 4. FIG. 9 is different from FIG. 4 in that Step S2031 and Step S2041 are provided in place of the steps S203 and S204 in FIG. 4, and that Step S205 is omitted.

Differences from FIG. 4 alone will be described hereinafter. In determination at Step S202 in FIG. 9, when the camera 100 is moving rearwards, the control unit 101 utilizes the face detection unit 104 to detect a face and determines whether a facial part of the same subject is present in a central portion of an image obtained through the imaging unit 102 for a predetermined time period (Step S2031). In the determination at Step S2031, when the facial part of the same subject is not present in the central portion of the image obtained through the imaging unit 102 for the predetermined time period, the control unit 101 terminates the processing in FIG. 9. On the other hand, in the determination at Step S2031, when the facial part of the same subject is present in the central portion of the image obtained through the imaging unit 102 for the predetermined time period, the control unit 101 determines whether a moving speed of the camera 100 is higher or lower than a predetermined speed (Step S2041). In the determination at Step S2041, when the moving speed of the camera 100 is lower than the predetermined speed, the control unit 101 terminates the processing in FIG. 9. On the other hand, in the determination at Step S2041, when the moving speed of the camera 100 is higher than the predetermined speed, the control unit 101 executes processing at Step S208 and subsequent steps.

In the wide-direction zoom control of such a modification, zoom driving toward the wide-side involved by the rearward movement of the camera 100 is carried out only in a period that the same subject is captured in the central portion of the image.

Figure 10:
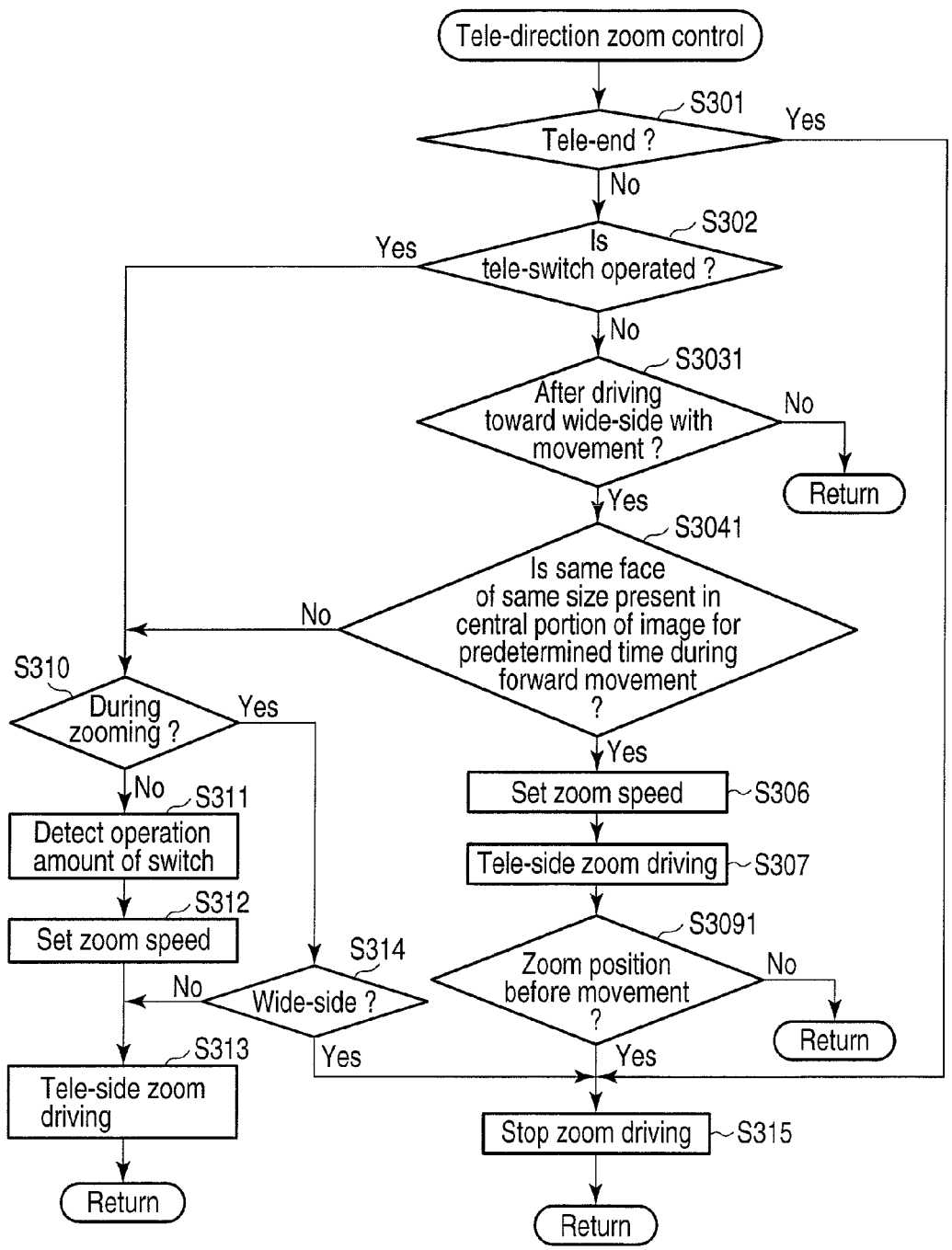
FIG. 10 is a flowchart showing a modification of the tele-direction zoom control processing.

A modification of the tele-direction zoom control processing will now be described with reference to FIG. 10. It is to be noted that, in FIG. 10, step numbers different from those in FIG. 5 denote steps different from those in FIG. 5. Differences of FIG. 10 from FIG. 10 lie in that Step S3031 and steps S3041 and S3091 are provided in place of steps S303, 5304, and S309 in FIG. 5, and that the steps S305 and 5308 are omitted.

Differences from FIG. 5 alone will be described hereinafter. In the determination at Step S302 in FIG. 10, when the tele-switch is not operated, the control unit 101 determines whether zoom driving toward the wide-side was performed with a rearward movement of the camera 100 in the past (Step S3031). In the determination at Step S3031, when the zoom driving toward the wide-side was not performed with the rearward movement of the camera 100 in the past, the control unit 101 terminates the processing depicted in FIG. 10. On the other hand, in the determination at Step S3031, when the zoom driving toward the wide-side was performed with the rearward movement of the camera 100 in the past, the control unit 101 determines whether the camera 100 is moving forward and whether a facial part of the same subject is present in a central portion of an image obtained through the imaging unit 102 for a predetermined time period from an acceleration detection result acquired from the movement detection unit 106 at Step S103 in FIG. 3 (Step S3041). In the determination at Step S3041, when the camera 100 is not moving forward or when the facial part of the same subject is not present in the central portion of the image obtained through the imaging unit 102, the control unit 101 terminates the processing depicted in FIG. 10.

Further, in the determination at Step S3041, when The camera 100 is moving forward and the facial part of the same subject is present in the central portion of the image obtained through the imaging unit 102 for a predetermined time period, the control unit 101 sets a driving speed (a zoom speed) for the zoom lens 1021a in accordance with an acceleration (which may be a speed instead) of the camera 100 (Step S306). After setting the zoom speed, the control unit 101 utilizes the zoom/focus/aperture control unit 1011 to control the zoom/focus/aperture drive unit 103, thereby driving the zoom lens 1021a toward the tele-side in accordance with the zoom speed set at Step S306 (Step S307).

After the zoom driving toward the tele-side, the control unit 101 determines whether a current position of the zoom lens 1021a is a zoom position before performing the zoom driving toward the wide-side (Step S3091). In the determination at Step S3091, when the current position of the zoom lens 1021a is not the zoom position before performing the zoom driving toward the wide-side, the control unit 101 terminates the processing depicted in FIG. 10. On the other hand, in the determination at Step S3091, when the current position of the zoom lens 1021a is the zoom position before performing the zoom driving toward the wide-side, the control unit 101 stops the zoom driving (Step S315). Then, the control unit 101 terminates the processing depicted in FIG. 10.

In such tele-direction zoom control according to the modification, the zoom driving toward the tele-side involved by the forward movement of the camera 100 is performed during a period that the same subject is captured in a central portion of an image. At this time, when a position of the zoom lens 1021a becomes a position before performing the zoom driving toward the wide-side in the past, the zoom driving is terminated.

[Second Embodiment]

A second embodiment according to the invention will now be described. The second embodiment is an application example when an imaging apparatus is a digital camera with interchangeable lenses.

Figure 11:
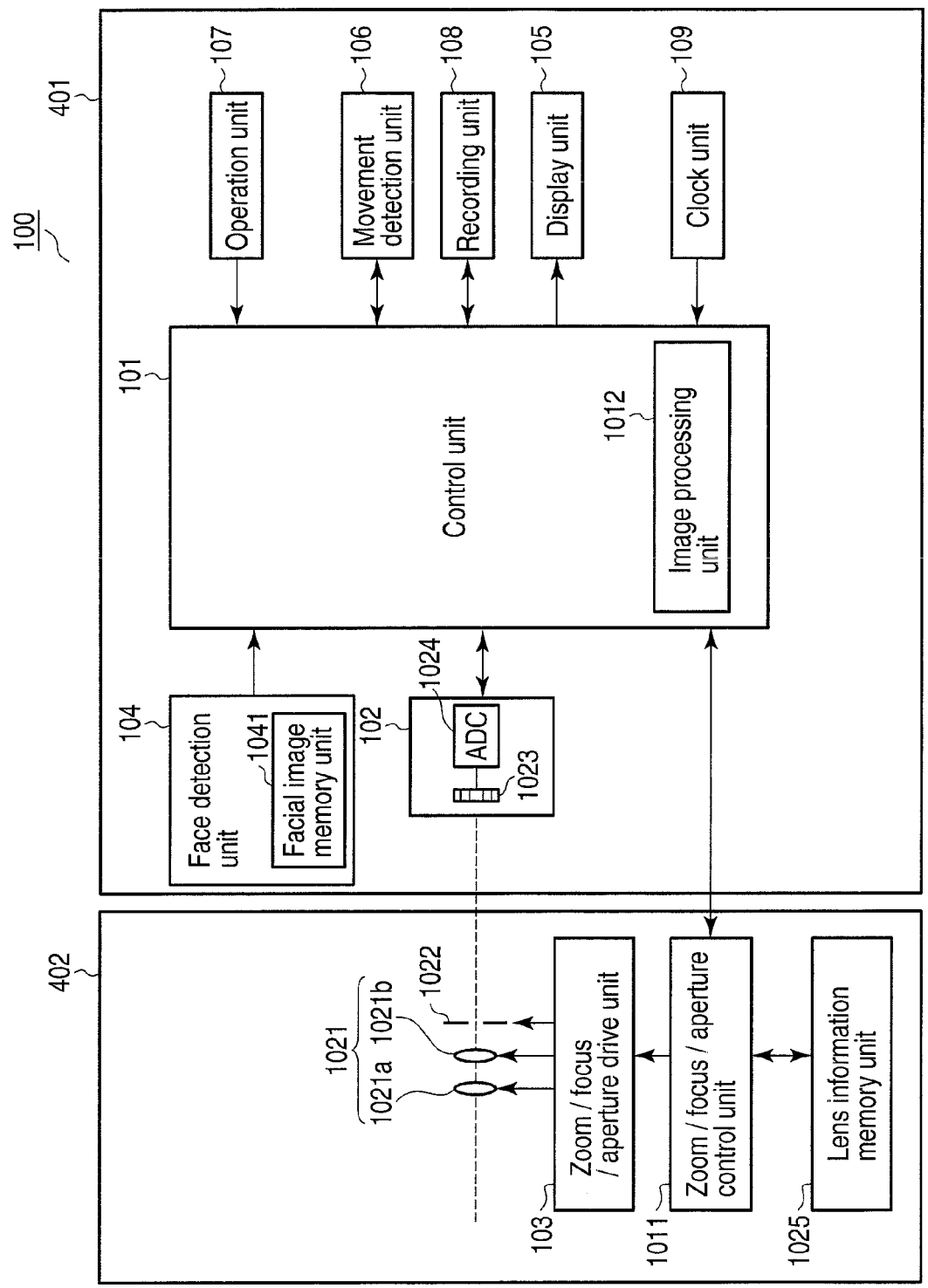
FIG. 11 is a view showing a configuration of a digital camera as an example of an imaging apparatus according to a second embodiment of the invention.

FIG. 11 is a view showing a configuration of a digital camera as an example of an imaging apparatus according to the second embodiment of the invention. In FIG. 11, a camera 100 includes a camera main body 401 and an interchangeable lens system 402 which is attachable to/detachable from the camera main body 401. It is to be noted that structures equal to those in FIG. 1 are denoted by reference numerals equal to those in FIG. 1, thereby omitting a description thereof.

The camera main body 401 includes a control unit 101, an imaging unit 102, a face detection unit 104, a display unit 105, a movement detection unit 106, an operation unit 107, a recording unit 108, and a clock unit 109. Here, FIG. 11 is different from FIG. 1 in that the imaging unit 102 includes an imaging element 1023 and an ADC 1024 alone.

The interchangeable lens system 402 includes a lens system 1021, an aperture diaphragm 1022, a zoom/focus/aperture drive unit 103, a zoom/focus/aperture control unit 1011, and a lens information memory unit 1025. The lens information memory unit 1025 is a memory unit that stores lens information. The lens information is characteristic information required to execute zoom control, focus control, and aperture control. This lens information includes, e.g., focal distance information of the lens system 1021 associated with positions of a zoom lens 1021a and a focus lens 1021b. The lens information memory unit 1025 can communicate with the zoom/focus/aperture control unit 1011. The zoom/focus/aperture control unit 1011 in the second embodiment reads the lens information from the lens information memory unit 1025 and transmits this read lens information to the control unit 101.

Figure 12:
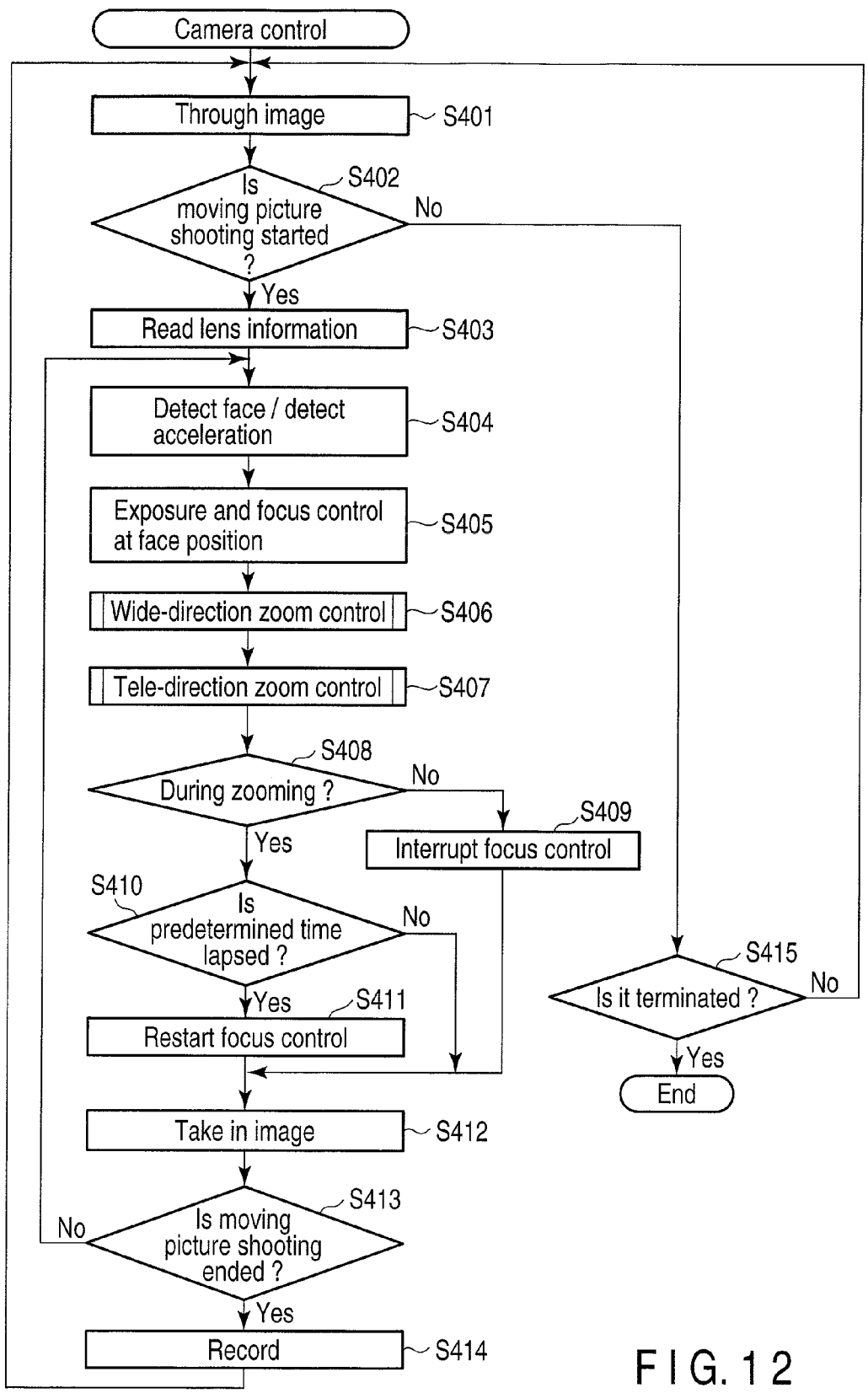
FIG. 12 is a flowchart showing an operation at the time of moving picture shooting of the imaging apparatus according to a second embodiment of the invention.

An operation of the camera 100 according to the second embodiment will now be described. FIG. 12 is a flowchart showing an operation at the time of moving picture shooting performed by the camera 100 according to the second embodiment.

When an operation mode of the camera 100 is set to a moving picture shooting mode, an operation depicted in FIG. 12 begins. The control unit 101 first executes through image display (Step S401).

After the through image display, the control unit 101 determines whether start of shorting a moving image has been instructed by an operation of the operation unit 107 by a user (Step S402). In the determination at Step S402, when the start of shooting a moving picture has been started, the control unit 101 controls the zoom/focus/aperture control unit 1011 to read lens information stored in the lens information memory unit 1025 of the interchangeable lens system 402 (Step S403). Then, the control unit 101 detects an image of a facial part by using the face detection unit 104 and also detects an acceleration generated in the camera 100 by using the movement detection unit 106 (Step S404).

After the face detection and the acceleration detection, the control unit 101 controls exposure of the imaging unit 102 in such a manner that exposure of the facial part detected by the face detection unit 104 becomes correct exposure. Further, the control unit 101 controls a focal position of the focus lens 1021b in such a manner that the facial part detected by the face detection unit 104 is focused (Step S405). At the time of the focus control, the control unit 101 uses the lens information in addition to contrast of the facial part of the image obtained by the imaging unit 102, thereby controlling the focal position of the focus lens 1021b.

After the exposure control and the focus control, the control unit 101 performs wide-direction zoom control processing (Step S406). After the wide-direction zoom control processing, the control unit 101 performs tele-direction zoom control processing (Step S407). Here, basic processing of the wide-direction zoom control processing and the tele-direction zoom control processing is the same as that in the first embodiment. However, the second embodiment is different from the first embodiment in that the lens information is also used at the time of zooming of the zoom lens 1021a.

After the tele-direction zoom control processing, the control unit 101 determines whether the zoom lens 1021a is being driven (Step S408). In the determination at Step S408, when the zoom lens 1021a is being driven, the control unit 101 interrupts the focus control of the focus lens 1021b (Step S409). Then, the processing is advanced to Step S412. On the other hand, in the determination at Step S408, when the zoom lens 1021a is not being driven, the control unit 101 determines whether a predetermined has elapsed (Step S410). In the determination at Step S410, when the predetermined time has elapsed, the control unit 101 restarts the focus control of the focus lens 1021b (Step S411).

After Step S409, when the predetermined time has not elapsed in the determination at Step S410, or after Step S411, the control unit 101 takes an image obtained through the imaging unit 102 into a non-illustrated memory (Step S412). Thereafter, the control unit 101 determines whether end of shooting a moving image has been instructed by an operation of the operation unit 107 by a user (Step S413). In the determination at Step S413, when the end of shooting a moving image has not been instructed, the processing returns to Step S404. In this case, the control unit 101 continues the shooting of a moving picture. On the other hand, in the determination at Step S413, when the end of the shooting a moving image has been instructed, the control unit 101 executes image processing (e.g., moving picture compression processing) with respect to the moving image taken in the memory by using an image processing unit 1012 and then stores the processed moving image in the memory unit 108 (Step S414). Subsequently, the processing returns to Step S401.

Further, in the determination at Step S402, when the start of shooting a moving image has not been instructed, the control unit 101 determines whether end of the moving picture shooting mode has been instructed (Step S415). In the determination at Step S415, when the end of the moving image shooting mode has not been instructed, the processing returns to Step S401. On the other hand, in the judgment at the step S415, when the end of the moving image shooting mode has been instructed, the control unit 101 terminates the processing shown in FIG. 12.

As described above, in the second embodiment, the wide-direction zoom control processing and the tele-direction zoom control processing can be applied in the digital camera with interchangeable lenses. Furthermore, in the second embodiment, since an optimum operation is carried out for a wide variety of interchangeable lenses in accordance with many scenes, a wider range of representations than in the first embodiment can be taken.

Here, in the wide-direction zoom control processing and the tele-direction zoom control processing according to the second embodiment, a zoom speed may be changed in accordance with lens information stored in the lens information memory unit 1025 or a state of the lens system 1021 at the time of shooting. As a result, for example, when a 10-power zoom lens system 1021 is used, a zoom speed when returning to the wide-side from the tele-side can be changed to be higher than that of a 3-power zoom lens system 1021.

Moreover, in the first and second embodiments, as the operation of the camera 100, the operation at the time of shooting a moving picture is exemplified. In reality, the operation can be applied to various cases to which the zoom control can be applied. For example, the zoom control according to the foregoing embodiments may be performed at the time of the through image display in still picture shooting.

Furthermore, in the foregoing embodiments, a field angle of an image is changed by driving the zoom lens 1021a. On the other hand, a field angle of an image may be changed by electronic zoom using image scaling processing by the image processing unit 1012.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging unit which comprises a lens that forms an image of a subject and which is configured to acquire a picture image by taking the image formed by the lens;
    a field angle change unit configured to change a field angle of the lens; and
    a movement detection unit configured to detect a movement of the imaging apparatus,
    wherein the field angle change unit changes the field angle of the lens to a wide-angle side when the moving direction of the imaging apparatus is a direction along which the lens moves away from the subject or when a wide-switch is operated manually, and
    wherein the field angle change unit automatically changes the field angle of the lens to a telephotographic side, without manual tele-switch operation, after driving the lens toward a wide-angle side due to movement of the imaging apparatus away from the subject.

2. The apparatus according to claim 1, wherein the field angle change unit changes the field angle of the lens to the telephotographic side when a face is detected in a central portion of the image formed.

3. The apparatus according to claim 1, wherein the movement detection unit further detects an acceleration or a speed when the imaging apparatus is moving, and
    the field angle change unit switches a change speed for the field angle of the lens when the imaging apparatus is moving in accordance with the acceleration or the speed.

4. The apparatus according to claim 2, wherein the field angle change unit changes the field angle of the lens to the telephotographic side when the moving direction of the imaging apparatus is a direction along which the lens gets closer to the subject, and
    wherein the movement detection unit further detects an acceleration or a speed when the imaging apparatus is moving, and
    the field angle change unit switches a change speed for the field angle of the lens when the imaging apparatus is moving in accordance with the acceleration or the speed.

5. The apparatus according to claim 3, wherein the lens is attachable to/detachable from a main body of the imaging apparatus, and
    the field angle change unit acquires characteristic information of the lens from the lens attachable to/detachable from the main body of the imaging apparatus and switches the change speed for the field angle of the lens in accordance with the acceleration or the speed and the acquired characteristic information of the lens.

6. The apparatus according to claim 4, wherein the lens is attachable to/detachable from a main body of the imaging apparatus, and
    the field angle change unit acquires characteristic information of the lens from the lens attachable to/detachable from the main body of the imaging apparatus and switches the change speed for the field angle of the lens in accordance with the acceleration or the speed and the acquired characteristic information of the lens.

7. The apparatus according to claim 1, further comprising:
    a face detection unit configured to detect a facial part of the subject in the picture image acquired by the imaging unit; and
    a facial image memory unit configured to store a picture image of the facial part detected by the face detection unit when the movement detection unit detects start of the movement of the imaging apparatus, wherein the field angle change unit terminates changing the field angle of the lens when a size of the picture image of the facial part of the subject detected by the face detection unit coincides with a size of the picture image of the facial part stored in the facial image memory unit.

8. The apparatus according to claim 2, further comprising:
a face detection unit configured to detect a facial part of the subject in the picture image acquired by the imaging unit; and
a facial image memory unit configured to store a picture image of the facial part detected by the face detection unit when the movement detection unit detects start of the movement of the imaging apparatus,
wherein the field angle change unit changes the field angle of the lens to the telephotographic side when the moving direction of the imaging apparatus is a direction along which the lens gets closer to the subject, and
wherein the field angle change unit terminates changing the field angle of the lens when a size of the picture image of the facial part of the subject detected by the face detection unit coincides with a size of the picture image of the facial part stored in the facial image memory unit.

9. The apparatus according to claim 3, further comprising:
a face detection unit configured to detect a facial part of the subject in the picture image acquired by the imaging unit; and
a facial image memory unit configured to store a picture image of the facial part detected by the face detection unit when the movement detection unit detects start of the movement of the imaging apparatus,
wherein the field angle change unit terminates changing the field angle of the lens when a size of the picture image of the facial part of the subject detected by the face detection unit coincides with a size of the picture image of the facial part stored in the facial image memory unit.

10. The apparatus according to claim 4, further comprising:
a face detection unit configured to detect a facial part of the subject in the picture image acquired by the imaging unit; and
a facial image memory unit configured to store a picture image of the facial part detected by the face detection unit when the movement detection unit detects start of the movement of the imaging apparatus,
wherein the field angle change unit terminates changing the field angle of the lens when a size of the picture image of the facial part of the subject detected by the face detection unit coincides with a size of the picture image of the facial part stored in the facial image memory unit.

11. The apparatus according to claim 5, further comprising:
a face detection unit configured to detect a facial part of the subject in the picture image acquired by the imaging unit; and
a facial image memory unit configured to store a picture image of the facial part detected by the face detection unit when the movement detection unit detects start of the movement of the imaging apparatus,
wherein the field angle change unit terminates changing the field angle of the lens when a size of the picture image of the facial part of the subject detected by the face detection unit coincides with a size of the picture image of the facial part stored in the facial image memory unit.

12. The apparatus according to claim 6, further comprising:
a face detection unit configured to detect a facial part of the subject in the picture image acquired by the imaging unit; and
a facial image memory unit configured to store a picture image of the facial part detected by the face detection unit when the movement detection unit detects start of the movement of the imaging apparatus,
wherein the field angle change unit terminates changing the field angle of the lens when a size of the picture image of the facial part of the subject detected by the face detection unit coincides with a size of the picture image of the facial part stored in the facial image memory unit.

13. The apparatus according to claim 1, wherein the field angle change unit changes the field angle of the lens to a wide-angle side when both (1) the moving direction of the imaging apparatus is a direction along which the lens moves away from the subject and (2) the same subject is captured by the imaging unit.

14. The apparatus according to claim 1, wherein the field angle change unit changes the field angle of the lens to a wide-angle side when both (1) the moving direction of the imaging apparatus is a direction along which the lens moves away from the subject and (2) a moving speed of the imaging unit is lower than a predetermined speed.

15. The apparatus according to claim 1, wherein the field angle change unit changes the field angle of the lens to a wide-angle side when both (1) the moving direction of the imaging apparatus is a direction along which the lens moves away from the subject and (2) the subject is present for a predetermined time.

16. The apparatus according to claim 1, further comprising:
a face detection unit configured to detect a facial part of the subject in the picture image acquired by the imaging unit; and
a facial image memory unit configured to store a picture image of the facial part detected by the face detection unit when the movement detection unit detects a start of the movement of the imaging apparatus,
wherein the field angle change unit terminates changing the field angle of the picture image when the same face as the stored facial image is present in a central portion of image.

17. The apparatus according to claim 16, wherein the face detection unit detects whether a size of the picture image of the facial part of the subject coincides with a size of the picture image of the facial part stored in the facial image memory unit.

18. A computer-implemented method for use with an imaging apparatus, the computer-implemented method comprising:
forming, with a lens of the imaging apparatus, an image of a subject;
acquiring, with an imaging unit of the imaging apparatus, a picture image by taking the image formed by the lens;
detecting a movement of the imaging apparatus;
changing a field angle of the lens to a wide-angle side when a detected movement of the imaging apparatus is in a direction along which the lens moves away from the subject or when a wide-switch is operated manually; and automatically changing the field angle of the lens to a telephotographic side, without manual tele-switch operation, after driving the lens toward a wide-angle side due to movement of the imaging apparatus away from the subject.

* * * * *